UNITED STATES PATENT OFFICE.

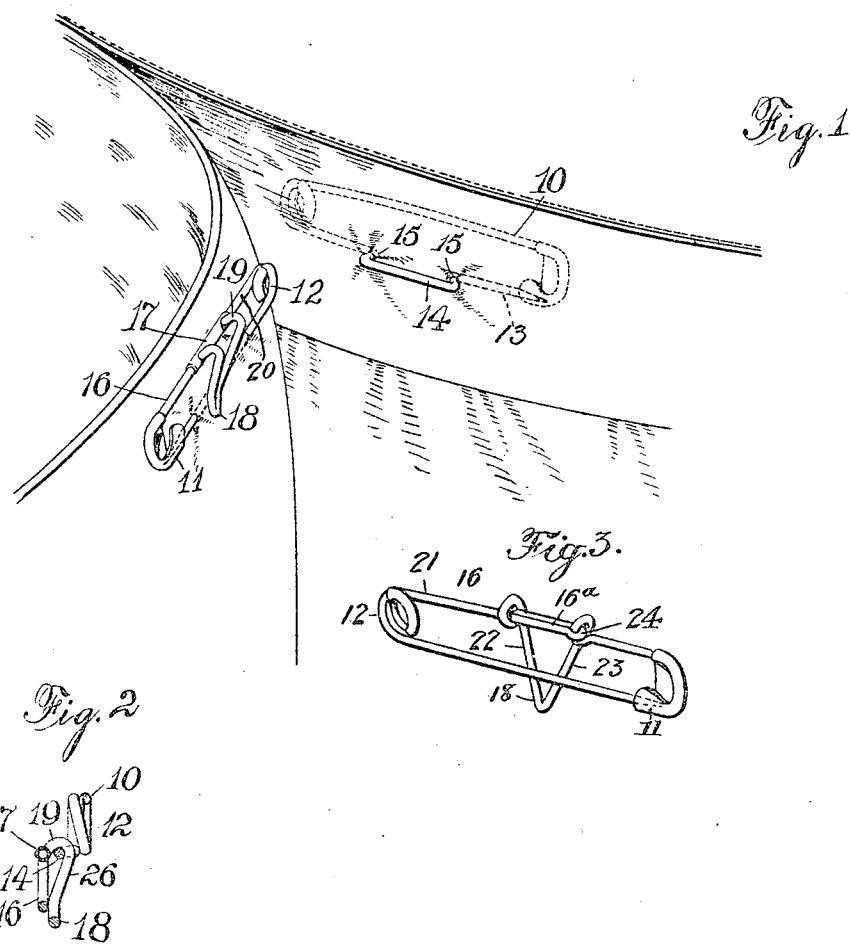

ELEANOR A. CAMPBELL, OF LOS ANGELES, CALIFORNIA.

SAFETY-PIN HOOK AND EYE.

No. 800,982.      Specification of Letters Patent.      Patented Oct. 3, 1905.

Application filed October 29, 1904. Serial No. 230,487.

*To all whom it may concern:*

Be it known that I, ELEANOR A. CAMPBELL, of Los Angeles, in the county of Los Angeles and State of California, have invented a new and Improved Safety-Pin Hook and Eye, of which the following is a full, clear, and exact description.

My invention relates to safety-pin hooks and eyes—that is, to hooks and eyes that are formed on safety-pins; and the object of my invention is to produce a simple, cheaply-made, and easily-operated article of this kind which can be readily applied to garments and other things and which affords a convenient and secure means of connecting and fastening together adjacent parts.

My invention is especially applicable to securing together garments or parts thereof, and in this connection and for similar purposes I provide means for producing an eye on the safety-pin in such a way that the pin may be easily secured to the garment, but only the eye will project through the cloth of the same to engage a hook, while the rest of the pin can be flat against the inside of the garment.

Another object of my invention is to construct a device so that when the hook and eye are in engagement the point of suspension of the hook will be above the back of the safety-pin, of which it forms a part, so that the hook will be seated in a way to prevent accidental displacement.

Reference is to be had to the accompanying drawings, forming a part of this specification, in which similar figures of reference indicate corresponding parts in all the views.

Figure 1 is a perspective view of both the hook and eye as adapted to fasten together two garments. Fig. 2 is a cross-section showing the hook and eye united, and Fig. 3 is a perspective view of a modified form of hook made integral with the back of the pin.

The pins are composed, as the usual safety-pin, of a spring-wire element that can be engaged and disengaged from a shield for the pin-point, this element being referred to hereinafter as the "pin" member, and another wire connecting the loop of the pin and the shield, this second wire being referred to hereinafter as the "back" of the pin.

The safety-pin 10 can be of any usual construction, and I have shown it as having a shield 11 at one end, the spring 12 at the opposite end, and the usual pin member 13. This member I provide with a lateral bend, forming an eye 14, the eye extending at an approximate right angle to the plane of the safety-pin, (see Fig. 1,) and the sides of the eye are preferably made to converge slightly, as at 15, thus making a closer eye, which engages the hook to better advantage.

The hook of the device is produced on the back 20 of the safety-pin 16, which, like the pin 10, can be of the usual construction, and as here shown the back of the pin is provided with a fixed sleeve 17, which can be applied in any well-known manner, but is preferably fastened as in my Patent No. 773,711.

The back 20 of the pin 16 projects through the sleeve 17, and having a slight upward projection 19 then turns to form the hook 18, this hook having the two members to give it necessary strength, and it is adapted to engage the eye 14.

The side members of the hook extend upward from the back 20 of the pin 16, as at 19, the members being then bent downwardly and inwardly, as shown at 26 in Fig. 2, so that the hook near its point has a normal spring contact with the pin member of the safety-pin 16. This construction forms a seat rather above the back of the safety-pin 16 and the garments attached to it being securely and with little danger of displacement.

Instead of forming the hook 18 as shown in Figs. 1 and 2 the back 21 of safety-pin 16 can be twisted to form the hook, as shown in Fig. 3. This hook is formed on the back 21 of the safety-pin by twisting the wire back upon itself to form a bridge $16^a$, then down, as at 22, to form the hook 18, and then upward, as at 23, passing through the loop 24, formed by the bending back aforesaid, and finally extending to the shield.

Where the device is applied to adjacent garments, as in Fig. 1, the safety-pin 10 is held on the inside of one garment and the pin member can be worked through the material of the same and then back, thus leaving only the eye 14 protruding, and this can be covered in any usual way.

Having thus fully described my invention, I claim as new and desire to secure by Letters Patent—

1. In a device of the kind described, the combination of two safety-pins, one having an eye on the pin part or member thereof, the eye being disposed approximately at a right angle to the plane of the safety-pin and said eye having sides slightly converging toward the pin member, and the second having a hook on the back thereof, said hook being turned upward, outward and downward to engage the eye on the pin member of the first-mentioned safety-pin.

2. In a device of the kind described, the combination of two safety-pins, one having an eye on the pin part or member thereof, the eye being disposed approximately at a right angle to the plane of the safety-pin, and the second having a hook on the back thereof formed of the same strand of wire as the back and being bent to form a bridge connecting two side members of the hook, said side members being turned upward, outward and then downward to engage the eye on the pin member of the first-mentioned safety-pin.

ELEANOR A. CAMPBELL.

Witnesses:
WARREN B. HUTCHINSON,
WILLIS A. BARNES.